United States Patent [19]

Sink

[11] 4,312,100

[45] Jan. 26, 1982

[54] APPARATUS FOR FILLETING FISH

[76] Inventor: Elmore L. Sink, 1455 Delta Dr., Saginaw, Mich. 48603

[21] Appl. No.: 158,719

[22] Filed: Jun. 12, 1980

[51] Int. Cl.³ ............................................. A22C 25/16
[52] U.S. Cl. ............................................ 17/56; 17/68
[58] Field of Search .............................. 17/56, 66, 68

[56] References Cited

FOREIGN PATENT DOCUMENTS 630470  5/1936  Fed. Rep. of Germany .......... 17/56
632024  7/1936  Fed. Rep. of Germany .......... 17/56

*Primary Examiner*—Willie G. Abercrombie
*Attorney, Agent, or Firm*—Learman & McCulloch

[57] ABSTRACT

Fish filleting apparatus has a base on which is supported a pair of substantially parallel mandrels spaced by a slot the confronting surfaces of which form cutting edges flanked by longitudinally extending grooves. Above the level of the mandrels is a pair of spaced apart guides which support a dressed fish with its back accommodated in the slot and its sides extending upwardly. An extruder blade is pivoted at one end on the base for movement through the slot in a direction toward the base. Such movement of the blade causes the spine of the fish and bones attached thereto to be extruded through the back of the fish and the two sides of the fish to be separated from one another.

14 Claims, 4 Drawing Figures

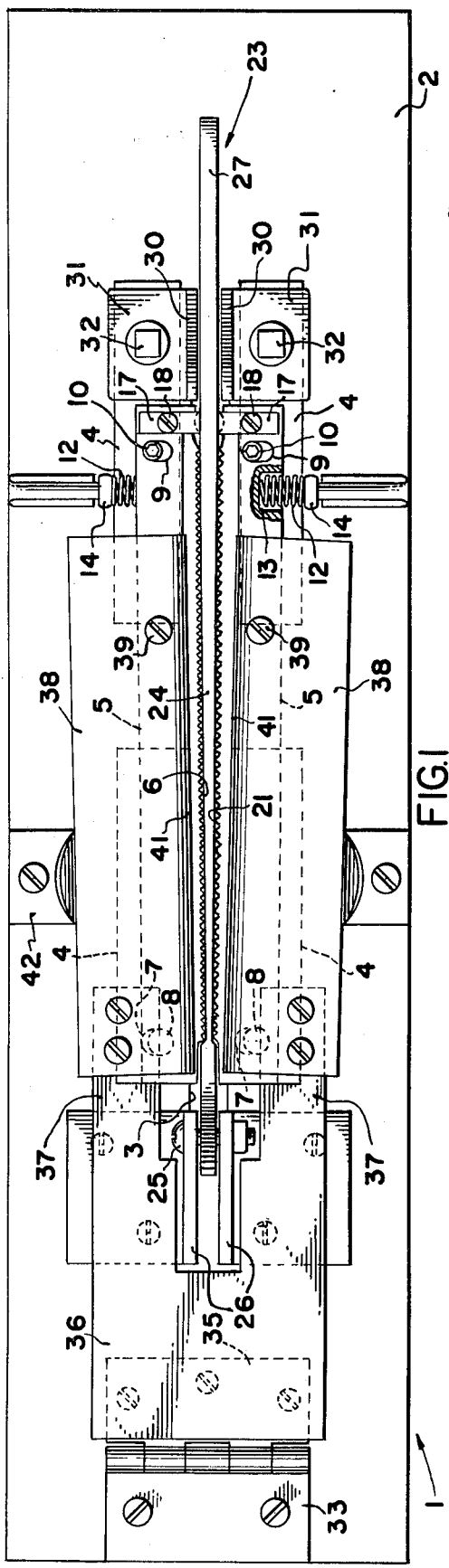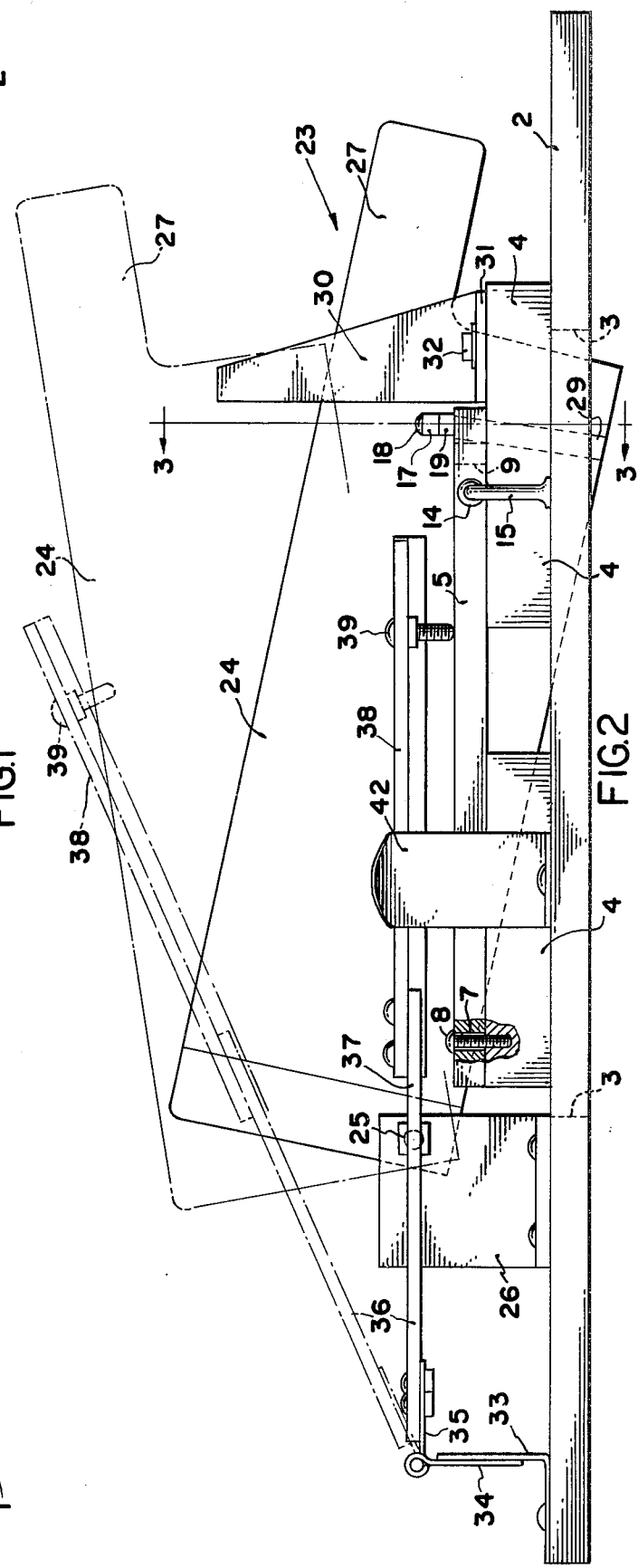

APPARATUS FOR FILLETING FISH

BACKGROUND OF THE INVENTION

This invention relates to apparatus for filleting fish and more particularly to a fixture in which a dressed fish may have its spine and remaining bones attached thereto stripped from the body of the fish, and at the same time, separate the body into two boneless fillets.

Sport fishing is an extremely popular pastime and also constitutes a principal source of food. It is not uncommon for individual or small groups of fishermen to catch a large number of pan fish, such as perch, bluegills, bass, and the like, in a single day. To prevent spoilage of the fish it is necessary that they be dressed fairly promptly. This usually involves the scaling, beheading, and eviscerating of each fish as well as the removal of the dorsal, ventrile, and caudal fins. If a fish is to be filleted, the opposite sides of the fish body are separated from the spine and ribs, thereby providing two boneless fillets. Filleting conventionally is accomplished manually by the use of a small, extremely sharp knife, but considerable skill is required in the filleting process to accomplish the task quickly and without waste.

Commercial fisheries or packing houses sometimes make use of large filleting machinery, such as that disclosed in German Pat. Nos. 630,470 and 632,024, but such machinery is not portable and creates a fair amount of waste. In addition, such machinery presents problems in ensuring that the bones on both sides of a fish body are removed.

An object of the present invention is to provide a portable, manually operable fish filleting device which accomplishes the filleting of a dressed fish quickly, easily, efficiently and without requiring prior experience.

SUMMARY OF THE INVENTION

Filleting apparatus according to the invention comprises a base having an elongate opening therein and upon which is supported a pair of mandrels separated from one another by a slot. The mandrels are adjustable toward and away from one another to vary the width of the slot to enable the apparatus to accommodate fish of greatly differing size. The confronting sides of the mandrels on opposite sides of the slot preferably are provided with serrated cutting edges. Alongside each cutting edge is a groove which helps position and maintain a fish body in proper position for filleting.

A pair of substantially parallel guide members are provided above the level of the mandrels to assist in positioning and supporting the body of a dressed fish with its back accommodated in the slot between the mandrels and its sides extending upwardly. An extruder blade is pivoted at one end on the base for movement about an axis in a direction to pass through the slot between the mandrels and in a direction toward the base. During such movement the blade exerts a force on the spine of the fish body sufficient to extrude the spine and bones attached thereto through the back of the fish body, thereby removing the spine and bones and separating the body of the fish into two boneless fillets.

DESCRIPTION OF THE DRAWINGS

Fish filleting apparatus constructed in accordance with a preferred embodiment of the invention is disclosed in the following description and illustrated in the accompanying drawings, wherein:

FIG. 1 is a top plan view;

FIG. 2 is a side elevational view;

DETAILED DESCRIPTION

Figure 3:
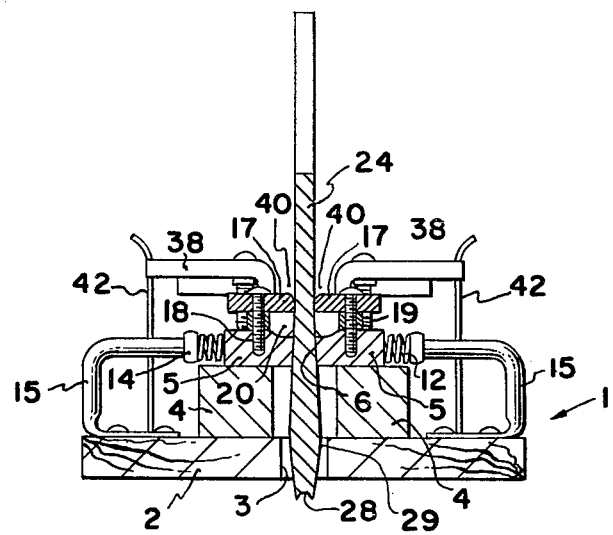
FIG. 3 is a sectional view taken on the line 3—3 of FIG. 2.

Fish filleting apparatus according to the invention is designated generally by the reference character 1 and comprises a base 2 having an elongate opening 3 therein. The base may be provided with supporting blocks or legs (not shown) adjacent its opposite ends. Fixed to the upper surface of the base 2 on opposite sides of the opening 3 are supports 4. Atop the supports 4 is a pair of substantially parallel mandrel members 5 spaced from one another to provide therebetween an elongate slot 6. At corresponding ends the mandrel members 5 are provided with transversely enlarged openings 7 through which extend screws 8 or the like which also extend into threaded openings formed in the supports 4. The construction is such that those ends of the mandrel members 5 through which extend the screws 8 are rockable about the axes of the screws and are adjustable toward and away from one another so as to vary the width of the slot 6.

The opposite ends of the mandrel members 5 also are provided with elongate openings 9 through which extend screws 10 which, like the screws 8, are threadedly fitted into openings formed in the supports 4. The opposite ends of the mandrel members 5 thus also are capable of movement toward and away from one another to vary the width of the slot 6.

The mandrel members 5 are yieldably biased in directions toward one another by a pair of opposed springs 12 having corresponding ends seated in sockets 13 formed in the mandrel members and their opposite ends seated on flanges 14 formed on rods 15 fixed to the base 2. The minimum and maximum widths of the slot 6 is determined by the lengths of the openings 7 and 9.

Adjacent the openings 9 the free end of each mandrel 5 is provided with a wearplate 17 that overlies the mandrels and is secured thereto by screws 18 and spacers 19. Each wearplate 17 has a depending lug 20 for a purpose presently to be explained.

Figure 4:
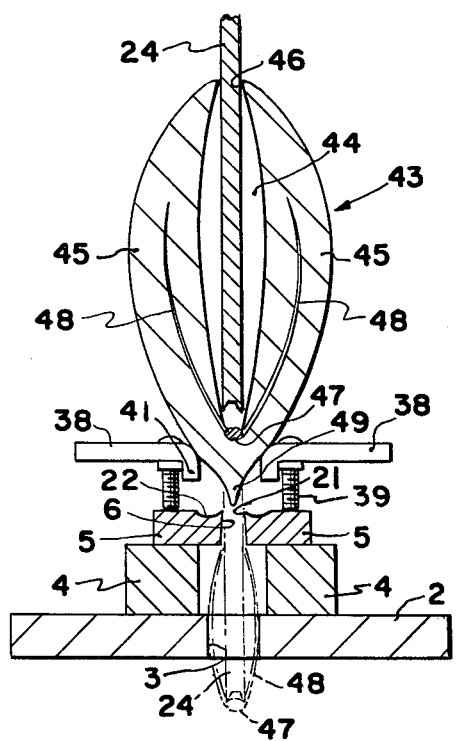
FIG. 4 is a view generally similar to FIG. 3, but illustrating a dressed fish body in condition to be filleted.

As is best shown in FIG. 4, the confronting sides of the mandrel 5 on opposite sides of the slot 6 are provided with cutting edges 21 which, if desired, may be toothed or serrated as is shown in FIG. 1. Extending alongside each cutting edge 21 is a groove 22. As is shown in FIG. 3, the lugs 20 are accommodated in the grooves 22.

An extruder blade 23 comprises a body 24 pivoted at one end for rotation about an axis by means of a pin 25 and brackets 26. Preferably, the axis of rotation of the blade 23 is at a level above that of the mandrels 5 for a purpose presently to be explained. The blade body spans the length of the slot 6 and terminates in an operating handle 27 for facilitating rotation of the blade.

As is best indicated in FIG. 1, that portion of the blade body 24 between the ends of the slot 6 tapers toward the pivoted end of the blade. The slot 6 is similarly tapered. As is best shown in FIG. 3, the lower edge of the blade body 24 is provided with a concave or grooved surface 28. Adjacent the handle end of the blade, the body 24 is provided with thickened portion 29 which tapers in all directions from the zone of maximum thickness. The thickened portion 29 is adapted to register with and pass between the wearplates 17.

At that end of the supports 4 adjacent the handle end of the blade 23 is a pair of upstanding, spaced apart guides 30 between which the blade body 24 may pass. Each guide 30 has a foot 31 that seats on the companion support 4 and is secured thereto by a bolt 32.

At that end of the base 2 adjacent the hinged end of the blade 23 is secured a bracket 33 to which is fixed one end of a hinge leaf 34, the other leaf 35 of which is secured to one end of a yoke 36 having legs 37 which straddle the brackets 26 and are joined at their free ends to guide fingers 38 which overlie the mandrels 5 and are spaced therefrom by adjustable screws 39. The guide fingers 38 are spaced from one another by a gap 40 and their confronting edges are turned downwardly to form lips 41. The gap 40 has a width greater than that of the slot 6. The fingers 38 are formed of a flexible material enabling them to be spread apart. Spring fingers 42 fixed to the base 2 and straddling the fingers 38 yieldably maintain the fingers in their normal positions. As is best shown in FIG. 1, the fingers 38 diverge from left to right.

To condition the apparatus for operation, the blade 23 is rotated counterclockwise from the position shown in FIG. 2 so as to provide unrestricted access to the slot 6 between the mandrel members 5. The guide fingers 38 are rotated to a position in which they overlie the mandrels 5. The apparatus then is in condition to fillet the body 43 of a dressed fish. A dressed fish in the context of this disclosure is one which has been beheaded and eviscerated. Evisceration provides a cleaned body cavity 44 flanked by the sides 45 of the body and also provides a slit 46 between the sides 45 in communication with the cavity 44. The spine 47 extends along the back of the body and has attached thereto ribs 48 embedded in the sides 45.

The fish body 43 is oriented with its tail end toward the hinged end of the blade 24 and with its back occupying the gap 40 between the guide fingers 38. The dorsal fin 49, if not previously removed, will aid in positioning the body 43 in the gap 40. The sides 45 of the body 43 may be spread apart to permit the blade 24 to enter the cavity 44 via the slit 46, and move toward the base of the cavity 44.

Upon engagement of the blade with the base of the cavity 44, further clockwise movement of the blade will cause the body 43 to move downwardly from the position shown in FIG. 4 until it rests upon the mandrels 5. Such downward movement of the body 43 is guided by the fingers 38 so as to ensure that the spine 47 is in register with the slot 6 between the mandrels 5.

Following engagement of the body 43 with the mandrels 5, further clockwise movement of the blade 23 will cause the grooved edge 28 of the blade to commence cutting of the body downwardly from the base of the cavity. The cutting force will be transmitted to the spine 47 so as to extrude the latter, together with the attached ribs 48, through the back of the body, resulting in removal of the bones 47 and 48 and separation of the sides 45 from one another.

By pivoting the blade 23 at a level above that of the mandrels 5, the blade will pass through the fish body with a shearing action, thereby minimizing the force that must be applied to fillet the body. The serrated edges 21 grip the fish body and prevent its sliding as the blade passes through the body.

The grooves 22 on opposite sides of the slot 6 aid in maintaining the spine 47 in alignment with the slot 6 during the extruding operation, and the concave cutting edge 28 of the blade 24 aids in retaining the spine 47 in alignment with the blade.

The thickened portion 29 of the blade 24 reacts with the wearplates 17 as the blade moves through its extruding stroke to spread the wearplates 17 apart, such movement being transmitted to the mandrels 5 via the engagement of the lugs 20 in the grooves 22. This ensures enlarging of the width of the slot 6 an amount sufficient to pass the thickest part of the spine 47, the thickest portion thereof being at the head end of the body 43. Once the zone of maximum thickness of the blade portion 29 has passed the wearplates 17, the springs 12 urge the mandrels 5 toward one another so as to restore the slot 6 to its original width.

The disclosure is representative of the preferred embodiment of the invention and is intended to be illustrative rather than definitive thereof. The invention is defined in the claims.

I claim:

1. Apparatus for filleting a dressed fish comprising a base; a pair of substantially parallel mandrel members mounted on said base and spaced by a slot, said mandrel members being adapted to support said fish with its back extending along said slot and its sides upstanding; an extruder blade; and means mounting said blade for movement between the sides of said fish and through said slot in a direction toward said base, such movement of said blade causing the spine of said fish and bones attached thereto to be extruded through the back of said fish and the sides of said fish to be separated from one another.

2. Apparatus according to claim 1 wherein said mandrel members are movable toward and away from one another to decrease and increase, respectively, the width of said slot.

3. Apparatus according to claim 1 wherein the slot between said mandrel members tapers from one end thereof toward the opposite end.

4. Apparatus according to claim 1 incuding spring means acting on said mandrel members and yieldably urging them in directions to minimize the width of said slot.

5. Apparatus according to claim 1 wherein said mandrel members have cutting edges confronting one another on opposite sides of said slot.

6. Apparatus according to claim 5 wherein said mandrel members are grooved alongside said cutting edges.

7. Apparatus according to claim 1 wherein said blade has a concave cutting edge.

8. Apparatus according to claim 1 including a pair of guides overlying said mandrel members and being spaced from one another a distance to accommodate said fish therebetween.

9. Apparatus according to claim 1 wherein said blade tapers from one end toward its opposite end.

10. Apparatus according to claim 1 wherein said blade is pivoted adjacent one end thereof for rocking movements about an axis.

11. Apparatus according to claim 10 wherein said axis is at a level spaced above that of said mandrel members.

12. Apparatus according to claim 10 including spaced apart guide means carried by said base for guiding that end of said blade remote from said axis.

13. Apparatus according to claim 1 wherein said blade has a cutting edge and an opposite edge, a portion of said blade having a cross-sectional configuration which tapers toward both of said edges from a zone of maximum width.

14. Apparatus according to claim 13 wherein said portion of said blade is adjacent one end only thereof.

* * * * *